Oct. 22, 1935.          H. ROCHOW          2,018,231
SELF INDUCTANCE VARIOMETER
Filed June 30, 1934

Inventor:
Hans Rochow
by R. C. Hopgood
Attorney

Patented Oct. 22, 1935

2,018,231

UNITED STATES PATENT OFFICE 2,018,231

SELF-INDUCTANCE VARIOMETER

Hans Rochow, Berlin-Tempelhof, Germany, assignor to C. Lorenz Aktiengesellschaft, Berlin-Tempelhof, Germany, a company Application June 30, 1934, Serial No. 733,197
In Germany June 30, 1933

3 Claims. (Cl. 171—242)

It is well known to construct self-inductance variometers by the use of ball coils or flat coils. Devices of this kind are also known which are between these two forms. With pure ball variometers, two spherical members on which the self-inductance turns are wound are rotated one within the other. With a simpler construction of the ball variometer, one of the coils is a cylindrical coil and the other only is spherical. Moreover, it is well known to slide or move two cylindrical coils one within the other and thereby to change the self-inductance. It is also well known to construct variometers by means of flat coils or kidney coils of flat shape, by contorting the planes of the flat or kidney coils with respect to each other. It is common to all these arrangements that according to the mutual position of the coils the self-inductances of the coils are subtracted or added. Moreover self-inductance variometers are well known in which the degree of coupling of the inductance coils varies dependent upon the angle of rotation, and in such a manner that the inductance varies according to a certain law.

According to the present invention the coils of a variometer are of substantially triangular form and are secured to the surface of two concentric members. These two members which, for example, may consist of cylinders, are adapted to rotate towards each other. One embodiment of the invention is described in the following with reference to the accompanying drawing in which Fig. 1 shows a longitudinal section through the device, whilst Fig. 2 is a development of the two cylinders and coils.

L1 represents one of the two coils, L2 the other. The coil L1 is secured on a cylinder J1, the coil L2 on a cylinder J2. These two cylinders are formed of insulating material. The cylinder J1 is firmly arranged on a shaft A by means of two end discs S1, S2, to which it is fixed by pins D. The cylinder J2 surrounds it concentrically and is non-rotatably connected by an annular member S4 to a securing plate B, in which the shaft A is pivoted. The end of the cylinder J2 remote from the plate B is closed by means of a disc S3, in which the shaft A is journalled. The cylinder J2 is attached to the discs S3, S4 by pins E.

Figure 1:
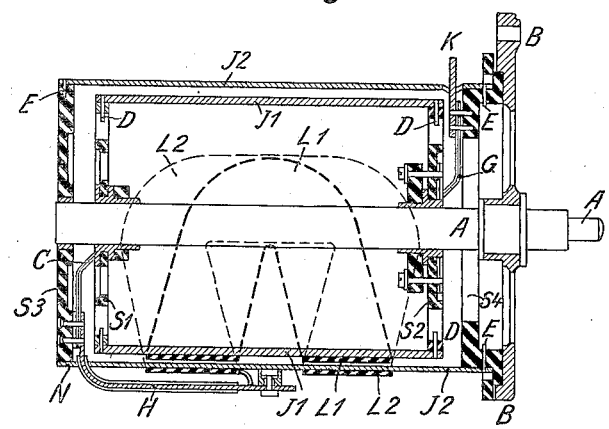
Figure 2:
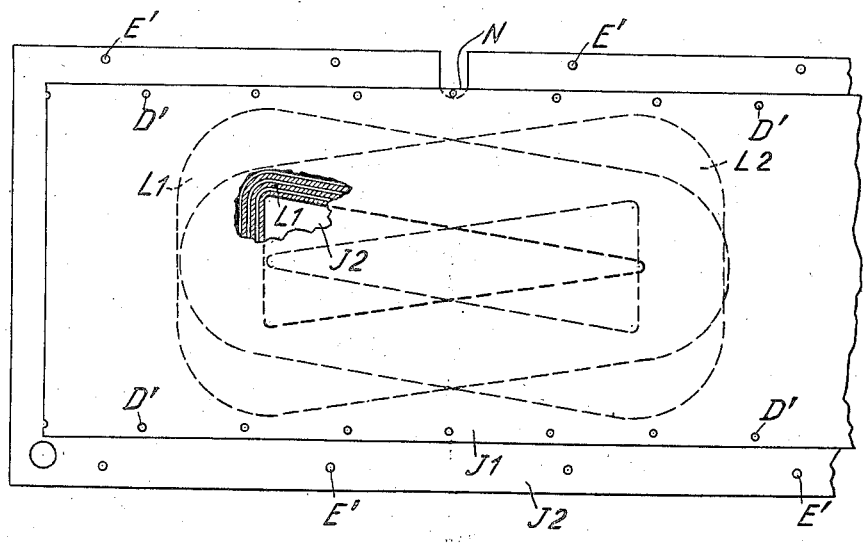

The coils L1 and L2 which are of approximately triangular form are indicated in development in dotted lines in Fig. 2. Their turns are secured flatly adjacent on the insulating plates J1, J2, from which the cylinders J1 and J2 are then formed. Fig. 2 shows a portion of some turns of the coil L1 arranged on the insulating plate J1, the plate J1 being for this purpose broken away at this point. Fig. 2 also shows holes D', E', with which the plates or cylinders J1 or J2 are provided so that they can be fixed by means of the pins D, E, which are shown in Fig. 1, to the portions S1 to S4.

The wiper brushes C, G shown in Fig. 1, and the conductors H and K shown there likewise, constitute current paths. The cylinder J2 has an aperture N through which the conductor H extends. The current paths are not explained in more detail as they form no part of the invention.

The shape of the coils is so chosen that with a rotation of the cylinder J1 the self-inductance is changed in a proportionate ratio. By a suitable choice of the dimensions (height and base of the triangle) any desired proportional curve can be obtained.

What is claimed is:

1. A self-inductance variometer comprising two relatively rotatable concentric members, and coils of substantially triangular form secured to the surfaces of these concentric members.

2. A variometer according to claim 1, characterized in this that the said concentric members consist of cylinders, one of which is rotatable within the other.

3. A variometer according to claim 1, characterized in this that said coils are flat in form and have their apices pointed in opposite directions.

HANS ROCHOW.